United States Patent
Oesterling

(12)
(10) Patent No.: US 6,542,818 B1
(45) Date of Patent: Apr. 1, 2003

(54) METHOD AND SYSTEM FOR REAL-TIME RECORDING AND UPLOADING OF VEHICLE ROUTES FOR ROUTING ASSISTANCE AND TRAFFIC REPORTING

(75) Inventor: Christopher L. Oesterling, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/059,549

(22) Filed: Jan. 29, 2002

(51) Int. Cl.$^7$ .............................................. G01C 21/30
(52) U.S. Cl. .......................... 701/209; 701/25; 701/35; 701/214; 701/216; 342/357.01; 342/357.08
(58) Field of Search .............................. 701/23, 25, 35, 701/209, 213, 214, 216; 342/357.01, 357.06, 357.08, 357.13

(56) References Cited

U.S. PATENT DOCUMENTS 5,014,206 A * 5/1991 Scribner et al. ............ 701/207
6,484,095 B2 * 3/2002 Wong et al. ................ 701/213

* cited by examiner

*Primary Examiner*—Gertrude Arthur
(74) *Attorney, Agent, or Firm*—Anthony Luke Simon

(57) ABSTRACT

The invention provides a method for creating a real-time recording of a mobile vehicle route using a wireless communication system. The recording is initiated by the driver of the vehicle. Positional information is obtained for the vehicle at set time intervals using a global positioning system. The positional information is recorded by an on-board system and saved along with a nametag assigned by the driver. The vehicle initiates a call to a predetermined number and uploads the recording to a central storage location. The recorded route is displayed on a Web site and can be viewed and modified by an identified user.

20 Claims, 2 Drawing Sheets

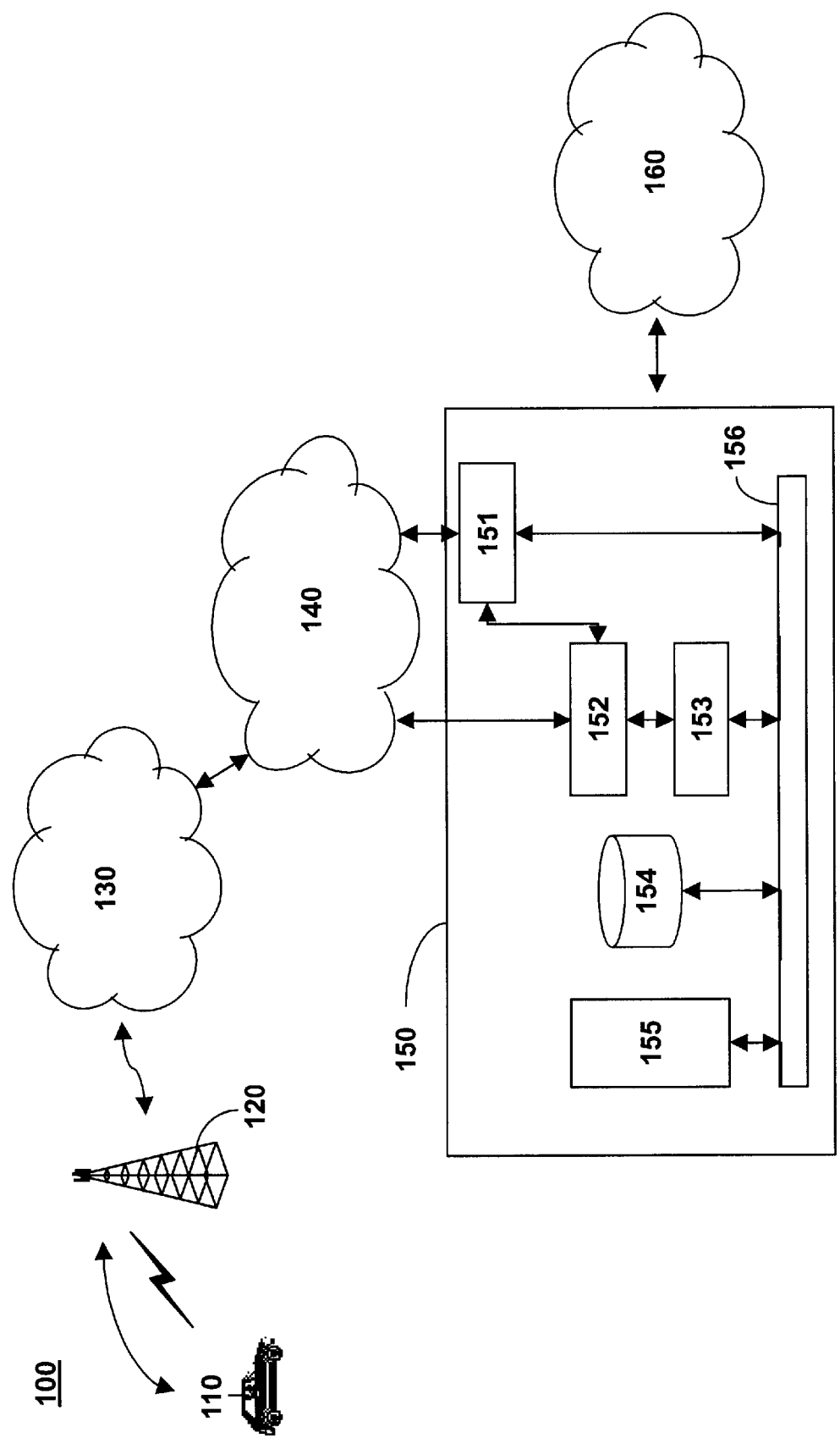

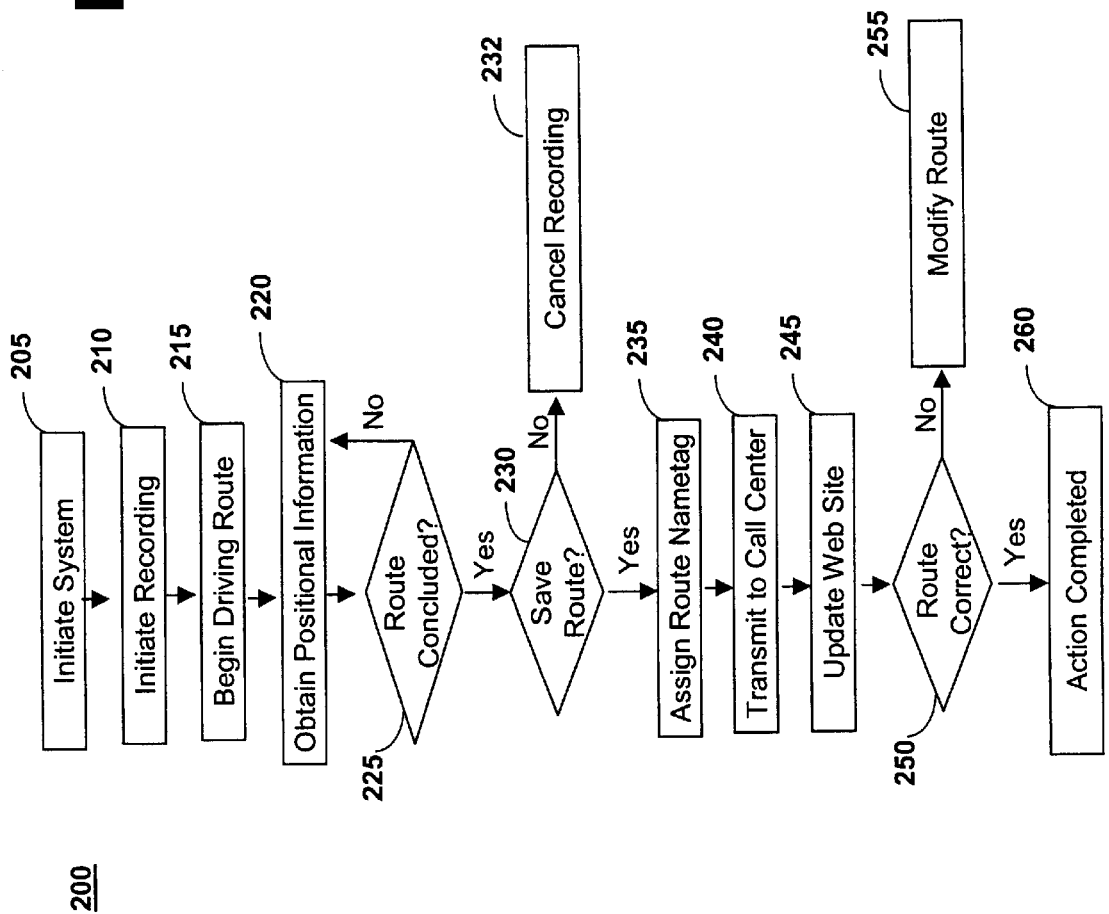

METHOD AND SYSTEM FOR REAL-TIME RECORDING AND UPLOADING OF VEHICLE ROUTES FOR ROUTING ASSISTANCE AND TRAFFIC REPORTING

FIELD OF THE INVENTION

This invention relates generally to data transmission over a wireless communication system. More specifically, the invention relates to a method and system for recording and uploading mobile vehicle routes.

BACKGROUND OF THE INVENTION

Wireless communication services for mobile vehicles, such as navigation and roadside assistance, have increased rapidly in recent years. Global Positioning System (GPS) satellite technology has played an important part in these services. With the aid of GPS technology, the position of a vehicle may be determined at any time. This allows a driver in distress to be located and helped promptly and aids in tracking stolen vehicles.

One of the more important navigation tools has been routing and location assistance, in which an advisor provides voice routing navigation assistance, including helping to find an alternate route if the driver is caught in traffic. To be effective, an advisor needs to know not only where the driver is, but also where the driver is going.

A substantial portion of any driver's time is spent on frequently traveled routes, such as the driver's daily commute to work or school or to other routine activities. A method is needed to provide accurate records of these frequently traveled routes. If an advisor had ready access to such records, routing assistance could be provided without having to ask a driver multiple questions each time about the intended destination. Automatic traffic reporting could also be provided with greater accuracy. This would greatly improve the service and, at the same time, the driver's satisfaction with the service. In addition, demand on a call center would be reduced, leaving advisors more time to deal with individual needs.

Therefore, it would be desirable to provide a method and system for real-time recording and uploading of vehicle routes for routing assistance and traffic reporting that overcomes the aforementioned and other disadvantages.

SUMMARY OF THE INVENTION

One aspect of the invention provides a method for creating a real-time recording of a mobile vehicle route using a wireless communication system. A recording may be initiated by the driver of the vehicle. Positional information may be obtained for the vehicle periodically at set time intervals. This positional information maybe be recorded using an on-board system. The recording may be assigned a nametag by the driver. The positional information recording may be uploaded to a central storage location.

The method may include initiating the recording by pressing a button or by pressing a button and issuing a voice command.

The recording of the positional information may be saved to an on-board system by the driver pressing a button or pressing a button and issuing a voice command. A voice prompt may ask the driver to assign a nametag to the recorded route. The vehicle communication device may initiate a call to a predetermined number and upload the positional information along with its associated nametag.

The method may further include displaying the route on a specified Web site. The route may be overlaid on a map. The method may also include enabling an identified user to modify the route on-line.

Another aspect of the invention provides a computer usable medium including a program for creating a real-time recording of a mobile vehicle route using a wireless communication system. The program may include computer program code for initiating the recording, obtaining positional information for the vehicle periodically at set time intervals, recording the positional information for the vehicle, saving the recording, assigning the recording a nametag, and uploading the positional information recording to a central storage location.

The computer usable medium may also include computer program code for displaying the route on a specified Web site, and the route may be displayed overlaid on a map. It may also include computer program code for enabling an identified user to modify the route on-line.

Another aspect of the invention provides a system for creating a real-time recording of a mobile vehicle route using a wireless communication system including a means for initiating the recording, obtaining positional information for the vehicle periodically at set time intervals, recording the positional information for the vehicle, saving the recording, assigning the recording a nametag, and uploading the positional information recording to a central storage location.

The system may also include a means for displaying the route on a specified Web site, and the route may be displayed overlaid on a map. The system may also include a means for an identified user to modify the route on-line.

The aforementioned, and other features and advantages of the invention, will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 1 is an illustration of one embodiment of a system for creating a real-time recording of a mobile vehicle route using a wireless communication system, in accordance with the current invention; and FIG. 2 is a flow diagram of one embodiment of a method for creating a real-time recording of a mobile vehicle route using a wireless communication system, in accordance with the current invention.

DETAILED DESCRIPTION OF THE PRESENTLY PREFERRED EMBODIMENTS

FIG.1 shows an illustration of one embodiment of a system for creating a real-time recording of a mobile vehicle route using a wireless communication system, in accordance with the present invention at 100.

Mobile vehicle route recording system 100 may contain one or more mobile vehicles 110, one or more wireless carrier systems 120, one or more communication networks 130, one or more land networks 140, and one or more call centers 150. Call center 150 may contain one or more switches 151, one or more data transmission devices 152, one or more communication services managers 153, one or more communication services databases 154, one or more advisors 155, and one or more bus systems 156. Call center 150 may provide information to Web site 160.

Mobile vehicle 110 may contain a wireless vehicle communication device, such as an analog or digital phone with suitable hardware and software for transmitting and receiving data communications. Mobile vehicle 110 may contain a wireless modem for transmitting and receiving data. The data may represent a real-time recording of a traveled route.

Mobile vehicle 110 may contain a global positioning system (GPS) unit capable of determining synchronized time and a geophysical location of the mobile vehicle. The GPS unit may be the source of positional information for the vehicle that is obtained at set time intervals. Other sources of the positional information may be location technologies such as time difference of arrival (TDOA), angle of arrival (AOA), cell of origin (COO), location pattern matching, or visual landmark recognition.

Mobile vehicle 110 may contain a digital signal processor with software and additional hardware to enable communications with the mobile vehicle and to perform other routines and requested services. For example, a routine may be obtaining and recording positional information from the GPS unit for a route traveled by the vehicle. Mobile vehicle 110 may have the capability of saving this positional information to flash memory or RAM or another appropriate onboard system well known in the art.

Mobile vehicle 110 may send radio transmissions to and receive radio transmissions from wireless carrier system 120. Wireless carrier system 120 may be a wireless communications carrier. Wireless carrier system 120 may be, for example, a mobile telephone system. The mobile telephone system may be an analog mobile telephone system operating over a prescribed band nominally at 800 MHz. The mobile telephone system may be a digital mobile telephone system operating over a prescribed band nominally at 800 MHz, 900 MHz, 1900 MHz, or any suitable band capable of carrying mobile communications. Wireless carrier system 120 may transmit to and receive signals from mobile vehicle 110. Wireless carrier system 120 may transmit to and receive signals from a second mobile vehicle 110. Wireless carrier system 120 may be connected with communications network 130.

Communications network 130 may comprise a mobile switching center. Communications network 130 may comprise services from one or more wireless communications companies. Communications network 130 may be any suitable system or collection of systems for connecting wireless carrier system 120 to a second mobile vehicle 110 or to a call center.

Land network 140 may be a public-switched telephone network. Land network 140 may comprise a wired network, an optical network, a fiber network, another wireless network, or any combination thereof. Land network 140 may comprise an Internet protocol (IP) network. Land network 140 may connect communications network 130 to a call center.

Land network 140 may connect a first wireless carrier system 120 with a second wireless carrier system 120. Communication network 130 and land network 140 may connect wireless carrier system 120 to a communication node or call center 150. The communication delivered to the call center may be, for example, a recording of positional information for a route traveled by the vehicle. The communication may be delivered to call center 150 by vehicle 110 initiating a call to a predetermined number.

Call center 150 may be a location where many calls may be received and serviced at the same time, or where many calls may be sent at the same time. The call center may be a telematics call center, prescribing communications to and from mobile vehicles 110. The call center may be a voice call center, providing verbal communications between an advisor in the call center and a subscriber in a mobile vehicle. The call center may contain each of these functions.

The call center 150 may contain switch 151. Switch 151 may be connected to land network 140 and may receive a modem signal from an analog modem or from a digital modem. Switch 151 may transmit voice or data transmission from a communication node. Switch 151 may also receive voice or data transmissions from mobile vehicle 110 through wireless carrier system 120, communications network 130, and land network 140. Switch 151 may receive from or send data transmissions to data transmission device 152. Switch 151 may receive from or send voice transmissions to advisor 155 via bus system 156.

Data transmission device 152 may send or receive data from switch 151. Data transmission device 152 may be an IP router or a modem. Data transmission device 152 may transfer data to or from advisor 155, one or more communication services managers 153, one or more communication services databases 154, and any other device connected to bus system 156. Data transmission device 152 may convey information received from communication network 130 to communication services manager 153.

Communication services manager 153 may be connected to switch 151, data transmission device 152, and advisor 155 through bus system 156. The call center may contain any combination of hardware or software facilitating data transmissions between call center 150 and mobile vehicle 110 and between call center 150 and Web site 160.

Communication services manager 153 may receive information from mobile vehicle 110 through wireless carrier system 120, communication network 130, land network 140, and data transmission device 152. Communication services manager 153 may send information to mobile vehicle 110 through data transmission device 152, land network 140, communication network 130, and wireless carrier system 120. Communication services manager 153 may provide information to mobile vehicle 110 from communication services database 154.

Communication services database 154 may contain records on one or more mobile vehicles 110. Communication services database 154 may be a central storage location for information received from mobile vehicles 110. Records in communication services database 154 may include vehicle identification, location information, status information, recorded positional information for a route traveled by the vehicle, and recent action information regarding mobile vehicle 110. Communication services database 154 may provide information and other support to communication services manager 153.

Advisor 155 may be a real advisor or a virtual advisor. A real advisor may be a human being in verbal communication with the mobile communication device of vehicle 110. A virtual advisor may be a synthesized voice interface responding to requests from the mobile communication device of vehicle 110. Advisor 155 may provide services to the mobile communication device of vehicle 110. Advisor 155 may communicate with communication services manager 153 or any other device connected to bus system 156. Advisor 155 may provide routing assistance and traffic reporting to mobile vehicle 110.

Call center 150 may provide information to Web site 160. The information provided to Web site 160 may be recorded positional information for a route traveled by the vehicle. Web site 160 may display this information overlaid on a map. The recorded route displayed on Web site 160 may be capable of modification by an identified user. Modification may be accomplished with dynamic HTML (DHTML), a Java applet, a client-side image map, Active X control, a browser plug-in, or any suitable method.

FIG. 2 shows a flow diagram of one embodiment of a method for creating a real-time recording of a mobile vehicle route using a wireless communication system, in accordance with the present invention at 200. Mobile vehicle route recording method 200 comprises steps to record and save positional information for a traveled route, display the route on a Web site, and enable an identified user to modify the saved route on-line.

A driver may initiate the system shown in FIG. 1. This may be accomplished by the driver pressing a button inside the vehicle 110. The button may activate the vehicle's onboard digital signal processor, which may respond with an audible signal, for example "Ready" (Block 205).

The driver may initiate recording a route (Block 210). To initiate a recording, the driver may issue a voice command, for example "Start recording route." The vehicle's onboard digital signal processor may give an audible response, for example "Recording route." The driver may then begin traveling the route that is to be recorded (Block 215.)

As the vehicle travels the route, positional information may be obtained at set time intervals (Block 220). The set time intervals may be 0.05, 0.1, 0.5, 1, 5, and up to 10 seconds. In the preferred embodiment, the time interval may be 1 second. Positional information may continue to be obtained until the route is concluded (Block 225).

Once the driver has traveled the entire route, the driver may either save the route information (230) or cancel the recording (232). Saving the route information may include the driver again pressing the button used to initiate the system, whereupon the onboard digital signal processor may again respond with an audible signal, for example "Ready." The driver may then issue a voice command, for example "Save route."

A nametag may be assigned to the route (Block 235). The onboard digital signal processor may request a nametag for the route, for example by delivering the audible statement "Route nametag please." At this point the driver may assign the route a name, for example by saying "Home to work." The onboard digital signal processor may then deliver an audible response, for example "Route stored."

The onboard digital signal processor may transmit the route and associated nametag to a central storage location (Block 240), which may be a communication services database 154 at a call center 150. This may be accomplished by the onboard digital signal processor initiating a call to a predetermined number through a wireless carrier system 120, perhaps also involving a communication network 130 and a land network 140, and delivering the information using a data transmission device 152.

The central location may then use this information to update a Web site 160 (Block 245). The driver may view the route information, which may be overlaid on a map, at the Web site and determine whether it is correct (Block 250).

If the route information requires modification, the driver may modify the route information shown on the Web site using a personal computer or any device through which the Web site may be accessed (Block 255). If the route information is correct, the action is complete (Block 260).

In practice, the route information obtained through the described method may be used by an advisor 155 to provide the driver of vehicle 110 with, for example, highly accurate routing assistance or automated traffic reporting for the recorded route. The method may be used for many other purposes, for example providing driving instructions for the recorded route to associates of the driver.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of creating a real-time recording of a mobile vehicle route using a wireless communication system, comprising:

initiating the recording;

obtaining positional information for the vehicle;

recording positional information for the vehicle;

saving the recorded positional information;

assigning a nametag to the recorded positional information; and uploading the recorded positional information with the assigned nametag to a central storage location.

2. The method of claim 1 wherein recording the positional information is initiated by pressing a button within the vehicle.

3. The method of claim 1 wherein recording the positional information is initiated by pressing a button within the vehicle and issuing a voice command.

4. The method of claim 1 wherein the positional information for the vehicle is obtained through a global positioning system.

5. The method of claim 1 wherein saving the recorded positional information is initiated by pressing a button within the vehicle.

6. The method of claim 1 wherein saving the recorded positional information is initiated by pressing a button within the vehicle and issuing a voice command.

7. The method of claim 1 wherein the positional information is saved to an onboard system.

8. The method of claim 1 wherein assigning a nametag to the recorded positional information is initiated by a voice prompt.

9. The method of claim 8 wherein a verbal response by the driver to the voice prompt assigns a nametag to the recorded route.

10. The method of claim 1 wherein the vehicle initiates a call to a predetermined number and uploads the positional information along with its associated nametag to a central storage location.

11. The method of claim 1 further comprising:

displaying the recorded route on a specified Web site.

12. The method of claim 11 wherein the recorded route is displayed overlaid on a map.

13. The method of claim 12 further comprising:

modifying the route displayed on the Web site.

14. A computer-usable medium including a program for creating a real-time recording of a mobile vehicle route using a wireless communication system, comprising:

computer program code for initiating the recording;

computer program code for obtaining positional information for the vehicle;

computer program code for recording positional information for the vehicle;

computer program code for saving the recorded positional information;

computer program code for assigning a nametag to the recorded positional information; and computer program code for uploading the recorded positional information with the assigned nametag to a central storage location.

15. The computer-usable medium of claim 14 further comprising:

computer program code for displaying the recorded route on a specified Web site.

16. The computer-usable medium of claim 15 wherein the recorded route is displayed overlaid on a map.

17. The computer-usable medium of claim 15 further comprising:

computer program code for modifying the route displayed on the Web site.

18. A real-time mobile vehicle route recording system comprising:

a means for initiating the recording;

a means for obtaining positional information for the vehicle;

a means for recording positional information for the vehicle;

a means for saving the recorded positional information;

a means for assigning a nametag to the recorded positional information; and a means for uploading the recorded positional information with the assigned nametag to a central storage location.

19. The system of claim 18 further comprising:

a means for displaying the recorded route on a specified Web site.

20. The system of claim 19 further comprising:

a means for modifying the route displayed on the Web site.

* * * * *